United States Patent Office 3,248,295
Patented Apr. 26, 1966

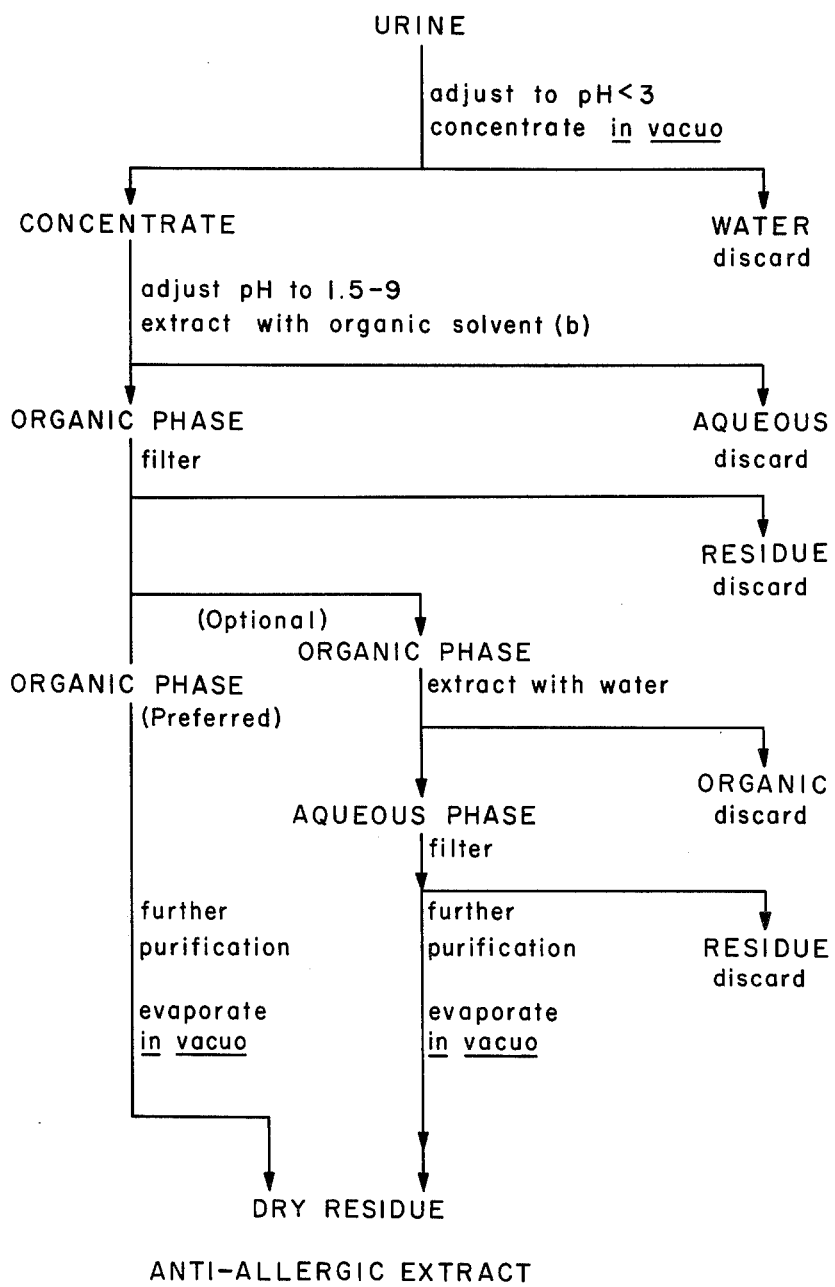

3,248,295
ANTI-ALLERGIC URINE EXTRACT AND METHOD OF MAKING SAME
Kenneth Ivan Melville and Béla A. Kovács, Montreal, Quebec, Canada, assignors to Canadian Patents and Development Limited, Ottawa, Ontario, Canada, a corporation of Canada
Filed Dec. 26, 1962, Ser. No. 247,010
7 Claims. (Cl. 167—74.5)

This invention relates to new extracts of mammalian urine having anti-allergic and anti-bradykinin properties. In particular a procedure for extracting an active material from urine is described, the active extract exhibiting antihistamine, antiacetylcholine, anti-bradykinin and anti-5-hydroxytryptamine properties, as well as preventing the anaphylactic reaction.

Many allergic and anaphylactic symptoms in animals and man are believed to be due, at least in part, to the extracellular release of compounds such as histamine, and 5-hydroxytryptamine. Substances able to inhibit the effects of these compounds are of interest in the treatment of allergies. Substances able to strongly inhibit the effects of both these compounds, and also of bradykinin and acetylcholine, are of particular interest.

We have now isolated from urine an extract which exhibits strong antagonism against effects of histamine (H), and 5-hydroxytryptamine (5-HT) in both in vitro and in vivo tests; and also exhibits antagonism against effects of acetylcholine (Ach) and bradykinin (Bk) in vitro. This extract also prevents the anaphylactic reaction.

Previously it has been shown that extracts of leucocytes (particularly eosinophils) exert antihistamine effects. Some evidence of antihistamine activity has also been reported in extracts prepared from blood, liver tissue, lung tissue, urine, and from normal dog and human gingiva. All of these prior extracts known to applicants are distinct from the extract of the present invention in not possessing the combination of properties described above.

In accordance with the present invention, mammalian (e.g. human, horse, dog, and rabbit) urine is subjected to an extraction procedure comprising the following steps:

(a) Urine (desirably freshly collected or refrigerated) is acidified to a pH of about 3 or below, preferably from 1.0–2.5 and concentrated in vacuo at below about 70° C. to less than about one fifth the original volume (desirably 5–10%).

(b) This concentrate, with pH within the range 1.5–9, preferably pH 2–7, is then extracted with about 2 to about 10 volumes (per vol. of concentrate) of a solvent selected from the group consisting of water-immiscible 2–10 carbon aliphatic ethers, and mixtures of said ethers with up to about 90 vol. percent of halogenated lower alkyl (i.e. $C_1$–$C_2$) hydrocarbons. Examples of operative solvents are diethylether, dipropylether, and mixtures thereof with chloroform, difluorodichloroethane, ethylene dichloride, or carbon tetrachloride.

(c) The extraction (b) may be repeated, the organic solvent extracts combined and evaporated to dryness preferably at reduced pressure at a temperature below 90° C. Alternatively the organic phase from (b) is extracted with water (e.g. about 1–3 vols. at neutral or acid pH).

(d) The dry residue or aqueous solution obtained in step (c) is desirably re-extracted with a solvent selected from the above described group consisting of water-immiscible ethers, and mixtures thereof with halogenated hydrocarbons, filtered and concentrated to dryness at reduced pressure.

(e) The dry residue containing the active principle is preferably redissolved in one of the group consisting of lower (i.e. alkyl $C_3$–$C_8$) ketones, water, 2–10 carbon aliphatic ethers, and mixtures of the ether(s) with up to 90% of lower alkyl halogenated hydrocarbons. Examples are as above under (b), and acetone.

(f) This solution under (e) desirably is further purified by filtration, dialysis, chromatography, counter-current distribution or a combination thereof.

The solution (from any of (b)–(e) above) may also be concentrated to dryness in vacuo and the residue kept preferably under an inert gas such as argon (or nitrogen) at about 0° C. or below (preferably −10° C.). The residue stored in this manner retains its activity indefinitely. The solution may be stored, desirably at 4° C. If the solution or dry residue is stored for extended periods in air at room temperature the activity decreases. The process is summarized in the attached drawing wherein the flowsheet for the present process is diagrammatically illustrated.

The dry residue obtained under (d) above, when tested in vitro, in concentrations of about 100–500µ g./ml. will (A) antagonize histamine, acetylcholine, bradykinin, and 5-hydroxytryptamine contractions of the isolated smooth muscle, and (B) prevent the anaphylactic reaction on isolated sensitized smooth muscle (see tests described below). Confirmatory in vivo results have been obtained in guinea pigs in the following tests: histamine aerosol, capillary permeability and anaphylactic shock (see examples).

The extract is characterized by the presence of infrared absorption bands at 3620, 1726, 1517, 1382, 1356, and 820 cm.$^{-1}$. It is only slightly soluble in lower alcohols but highly soluble in ether. No characteristic melting point is apparent.

The original urine used in the extraction should preferably be freshly collected or refrigerated, desirably at about 40 C. The pH may be adjusted in step (a) with mineral acid solution and in step (b) with an alkali metal hydroxide solution. The preferred solvents for the extraction steps (b) and (c) are diethylether, ether-chloroform, and ether-ethylene dichloride mixtures. The ether should constitute at least about 10% of the volume of the mixture. The extraction may be done continuously by recycling the organic phase. A continuous countercurrent apparatus is advantageous.

The following examples will illustrate the invention:

EXAMPLE 1

Freshly collected urine from normal human males (2.0 liters) was acidified with concentrated $H_2SO_4$ to a pH of 1.9 and concentrated in vacuo on a water bath at 60° C. to 1/10 the volume (200 ml.). This concentrate was neutralized with 10 N KOH to a pH of 6.9 and extracted twice with 4 volumes each of a diethyl ether-chloroform mixture (2:1). The extracts were then pooled and concentrated (in vacuo) to dryness on a water bath at 45° C. The dry residue was redissolved in 130 ml. of freshly distilled water-free ether-chloroform mixture (2:1), filtered, and concentrated to dryness in vacuo on a water bath at 35° C. This dry extract was dissolved in 50 ml. of freshly distilled water-free ether-chloroform mixture (2:1) and again filtered.

This final solution was concentrated to dryness in vacuo and the tarry residue (400 mg.) containing the active principle stored under argon at −10° C.

Test A

The terminal segments of ileum of guinea pigs (250–350 g.) were suspended in Tyrode solution in a 16 ml. bath at 34° C. The uteri of virgin rats (150–200 g.) pretreated subcutaneously 24 hours earlier with stilbestrol (0.2 mg.) were suspended in Jalon solution in a 16 ml. bath at 30° C. The contraction responses of both preparations were recorded continuously, on a smoked drum by a frontal writing lever. Acetylcholine chloride, histamine dihydrochloride, bradykinin or 5-hydroxytryptamine creatinine phosphate were tested at 3 minute intervals with the ileum, left in contact for 20, 20, and 40 seconds respectively and then washed out. 5-hydroxytryptamine creatinine phosphate, bradykinin or acetylcholine chloride were tested at 5 minute intervals with the uteri, left in contact for 90 seconds, then washed out.

The above dry urine extract from Example 1 was added to Tyrode or Jalon solution in sufficient quantities to give concentrations of 0.1–1.0 mg./ml., and the solutions filtered. These filtrates were used in this Test (A) on the ileum and uteri. The challenging agent—H, 5-HT, Ach or Bk—was also dissolved in Tyrode or Jalon solution, the dosage concentrations (g./ml.) being $10^{-7}$ for histamine compound, $10^{-7}$ for 5-hydroxytryptamine compound, $5 \times 10^{-8}$ for acetylcholine compound, and $10^{-7}$ for bradykinin. When any of these challenging agents were added to the bath preparations described above they invariably resulted in strong contraction. However, when 0.1 to 1.0 ml. of the above filtrates containing the urine extracts are added to the smooth muscle preparations in the 16 ml. baths 3 or 5 minutes prior to the challenging agents, the extract invariably reduced or abolished H, 5-HT or Bk contractions, with little effect on the Ach-induced contractions. However, larger doses [1–2 ml. of the above filtrates containing the urine extracts] completely abolished the responses to all four of these challenging agents.

*Test B*

The protective effect of the urine extracts against the in vitro anaphylactic reaction (Schultz-Dale experiment) is illustrated.

A guine pig was sensitized with 0.5 ml. 10% egg white solution given intraperitoneally. 20–23 days later the terminal segment of the guinea pig's ileum was suspended in 16 ml. Tyrode solution in a bath at 34° C. Strips of this sensitized guinea pig ileum invariably showed maximum contractions following addition of 0.1 ml. 10% egg white solution to the bath. However, when 0.1 to 1.0 ml. of the above Tyrode solution filtrates containing the urine extracts of the present invention, were added to the bath 3 to 6 minutes prior to addition of the egg white solution, the extract invariably reduced or abolished the contractions normally caused by the egg white solution.

EXAMPLE 2

Estrogen-extracted equine (PMU) urine was adjusted to pH 2 and then was concentrated to 10% in vacuo at 60° C. The concentrate was extracted with ether (10 vols.), the aqueous phase discarded and the ether phase concentrated to 5%. This ether concentrate was then evaporated to dryness to give a brown tarry residue which contained the bulk of the anti-allergic activity. The extract exhibited potent antihistamine, antiserotonin and anti-allergic activity in Test A above, and was used in Test C below.

Active extracts have been similarly obtained using ether-chloroform 3:1 or ethylene dichloride-ether.

*Test C.—Illustration of the protective effect of urine extracts in in vivo experiments against the bronchoconstrictor effect and capillary - permeability - increasing effect of histamine*

1. HISTAMINE AEROSOL TEST

Guinea pigs were exposed in a chamber to a 0.2% histamine aerosol using the Halpern type of Jouan vaporizing machine. The sensitivity of guinea pigs to the histamine aerosol under these conditions may greatly vary as previously shown [Brit. J. Pharmacol. 18:87–100 (1962)]. The following procedure was used to determine the efficacy of urine extracts in producing protection. An injected and an untreated control animal were together exposed to the histamine aerosol in the same chamber. The maximal time of exposure was 20 minutes. If respiration ceased earlier the time of cessation of respiration for both animals was recorded and the difference between their survival times determined.

In 8 experiments filtered saline solutions of the urine extract prepared from horse urine according to the method described in Example 2, were injected intraperitoneally into the guinea pigs. The amount of dry material used for injection into each guinea pig was between 100–120 mg. [equivalent to 350–400 ml. original urine]. One to two hours after the injection all animals still appeared normal, and each animal was exposed to the histamine aerosol together with an untreated control guinea pig.

In seven experiments, the injected animal survived longer than its control and only in one experiment was the difference in survival time less than one minute. Three of the injected animals survived the maximal 20 minutes exposure without any sign of bronchoconstriction. In contrast, the average survival time of their controls was 3 minutes 40 seconds.

Previous oral administration of 200 mg. urine extract (equivalent of 700 ml. urine) in guinea pigs has also been shown to produce complete protection against the lethal effect of a similar 0.2% histamine aerosol (test described as above).

2. CAPILLARY PERMEABILITY TEST

Guinea pigs depilated 24 hours previously were injected intracardially with trypan blue (30 mg./kg.). A few minutes after the injection of the dye 10 $\mu$g. histamine dihydrochloride in saline was injected intradermally into the abdominal skin. In untreated normal guinea pigs, due to increased capillary permeability, the protein-bound dye circulating in the blood seeped into the extravascular space and the histamine affected area became colored blue. When the same experiment was performed in guinea pigs which were pretreated with saline filtrates (3–4 ml.) containing 100–120 mg. urine extract prepared as in Test C, 1, above, the dye did not seep into the histamine-affected area within a period of 30 minutes observation.

*Test D.—In vivo activity against the symptoms of anaphylactic shock in guinea pigs*

Previously intraperitoneal injection of the urine extract into guinea pigs (as described above in Test C) has also been found to protect animals previously sensitized to egg white against fatal anaphylactic shock.

The urine extract may be dissolved in any suitable aqueous medium for injection, or combined with any suitable carrier for oral administration.

We claim:
1. A method of preparing an extract from mammalian urine, comprising,
    (a) acidifying urine to a pH below about 3 and concentrating to less than about ⅕ the original volume at a temperature below about 70° C.,
    (b) extracting the concentrate with a solvent selected from the group consisting of diethylether, dipropylether, and mixtures thereof with halogenated lower alkyl hydrocarbons, at a pH of above 1.5, but below about 9, and
    (c) evaporating the solvent phase at a temperature below 90° C., and adjusting the concentrate to above pH 2 but below pH 9, and extracting with a solvent selected from the group consisting of diethylether, dipropylether, and mixtures thereof with halogenated lower alkyl hydrocarbons, and evaporating the solvent phase at a temperature below about 90° C. to leave a dry residue.
2. A method of preparing an anti-allergic extract from mammalian urine comprising,
    (a) acidifying urine to a pH within the range of about 1.0 to about 2.5, concentrating this acidified urine to from 5 to 20 percent of the original volume in vacuo at a temperature within the range of about 50° C. to about 65° C.
(b) adjusting the pH to above 3, but below about 9, extracting this neutralized concentrate with a total of about 6 to about 10 volumes of a solvent selected from the group consisting of diethylether, dipropylether, and mixtures thereof with halogenated lower alkyl hydrocarbons,
(c) evaporating the solvent phase at a temperature within the range of about 40° C. to about 90° C.,
(d) dissolving the residue in one of the group consisting of water, alkyl 3–8 carbon ketones, diethylether, dipropylether, and mixtures of the ether with halogenated lower alkyl hydrocarbons, and recovering from the final solution a purified active principle.

3. A method of preparing an anti-allergic extract from fresh and refrigerated mammalian urine comprising,
(a) acidifying with mineral acid fresh or refrigerated urine to a pH within the range 1.0–2.5 and concentrating in vacuo at about 55°–65° C. to about $\frac{1}{10}$ the original volume,
(b) neutralizing the concentrate with alkali metal hydroxide to a pH of 3 to 7, and extracting with a total of from 6 to 10 volumes of a solvent containing from 10–100% diethylether, the balance being a halogenated lower alkyl hydrocarbon, and
(c) evaporating the solvent at a temperature of from 40 to 80° C. in vacuo.

4. The method of claim 3 including the further steps of
(d) dissolving the residue in a diethylether containing solvent as above described, filtering, and
(e) recovering purified anti-allergic extract from the solution of (d).

5. The method of claim 3 including the further step of
(d) dissolving the residue in water, filtering, and
(e) recovering purified anti-allergic extract from the solution of (d).

6. A method of preparing an anti-allergic extract from mammalian urine comprising,
(a) acidifying with mineral acid fresh or refrigerated urine to a pH within the range 1.0–2.5 and concentrating in vacuo at about 55°–65° C. to about $\frac{1}{10}$ the original volume,
(b) neutralizing the concentrate with alkali metal hydroxide to a pH of 3 to 7, and extracting with a total of from 6 to 10 volumes of a diethyl ether-chloroform mixture having at least 10% ether,
(c) evaporating the solvent at a temperature of from 40 to 80° C. in vacuo, and
(d) redissolving the residue in ether-chloroform of the same composition and recovering therefrom the anti-allergic extract.

7. The extract product recovered according to the process of claim 6.

References Cited by the Examiner
UNITED STATES PATENTS
2,578,729   12/1951   Nelson _____ 167—74.5

OTHER REFERENCES
Wheeler: J. Lab. and Clinical Med., vol. 42, No. 5, November 1953, p. 762.

JULIAN S. LEVITT, *Primary Examiner.*
FRANK CACCIAPAGLIA JR., *Examiner.*